(12) United States Patent
Brandon

(10) Patent No.: US 9,475,641 B1
(45) Date of Patent: Oct. 25, 2016

(54) DEBRIS CHUTE

(71) Applicant: Nigel Brandon, Phoenix, AZ (US)

(72) Inventor: Nigel Brandon, Phoenix, AZ (US)

( * ) Notice: Subject to any disclaimer, the term of this patent is extended or adjusted under 35 U.S.C. 154(b) by 0 days.

(21) Appl. No.: 15/224,983

(22) Filed: Aug. 1, 2016

Related U.S. Application Data

(60) Continuation-in-part of application No. 14/881,280, filed on Oct. 13, 2015, which is a division of application No. 14/132,613, filed on Dec. 18, 2013, now Pat. No. 9,212,001.

(51) Int. Cl.
*B65G 11/02* (2006.01)
*B65G 11/18* (2006.01)

(52) U.S. Cl.
CPC ............... *B65G 11/02* (2013.01); *B65G 11/18* (2013.01)

(58) Field of Classification Search
CPC ....... B65G 11/02; B65G 11/18; B65G 11/00; B65G 11/10; B65G 11/103; B65G 11/106; B65G 53/54; A01D 46/247; A01D 46/005
USPC .......................................... 198/25 C; 56/336
See application file for complete search history.

(56) References Cited

U.S. PATENT DOCUMENTS

| | | | |
|---|---|---|---|
| 233,771 A | 10/1880 | Kent | |
| 888,459 A * | 5/1908 | Bolinski | A01D 46/247 193/7 |
| 1,133,381 A * | 3/1915 | Kellogg | A01D 46/247 56/334 |
| 1,300,168 A | 4/1919 | Hoeber | |
| 1,339,338 A * | 5/1920 | Hickok | A01D 46/243 182/49 |
| 2,545,072 A * | 3/1951 | Denman | A01D 46/005 56/32 |
| 2,968,141 A | 1/1961 | Mcgough | |
| 3,595,001 A * | 7/1971 | Shumaker | A01D 46/247 182/15 |

(Continued)

FOREIGN PATENT DOCUMENTS

WO    WO 01/58246 A1    8/2001

OTHER PUBLICATIONS

Non-Final Office Action dated Aug. 19, 2015 from U.S. Appl. No. 14/132,613.

(Continued)

*Primary Examiner* — James R Bidwell
(74) *Attorney, Agent, or Firm* — Law Offices of Damon L. Boyd, PLLC

(57) ABSTRACT

Devices, systems and methods for debris removal are provided comprising a flexible chute having a mouth, a body, and an exit. The flexible material can be collapsible. The flexible material is rip-stop nylon. When the chute is used, a user can take the chute in a collapsed configuration and scale a tree for pruning. Upon reaching a top area of the tree, the user secures the chute to the tree and allows the body and exit portions to deploy by releasing those sections. Gravity allows the body and exit portions to fall to towards the ground. As debris is removed from the tree, it is placed into the mouth and passes through the body and out exit. If desired the exit can be placed in other desired locations such as proximate to a wood chipping device for shredding debris or proximate to a truck bed, dump box or trailer for catching the debris as it exits the chute. Thus, the chute can safely collect, control and direct debris generated from pruning vegetation.

15 Claims, 5 Drawing Sheets

(56) References Cited

U.S. PATENT DOCUMENTS

| | | | |
|---|---|---|---|
| 3,664,104 A * | 5/1972 | Jamshidi | A01D 46/005 56/332 |
| 3,807,540 A | 4/1974 | Boulet | |
| 3,854,273 A * | 12/1974 | Rosenberg | A01D 46/247 193/7 |
| 3,855,765 A | 12/1974 | Forkner | |
| 4,099,596 A | 7/1978 | Tracy | |
| 4,162,717 A | 7/1979 | Orii | |
| 4,827,705 A | 5/1989 | Souda | |
| 4,833,870 A | 5/1989 | Middleton | |
| 5,015,122 A | 5/1991 | Combes | |
| 5,137,219 A | 8/1992 | Morey | |
| D345,039 S | 3/1994 | Doyle | |
| D365,909 S | 1/1996 | Spenceley | |
| 7,815,401 B2 * | 10/2010 | Bryan, Jr. | B65G 51/06 406/113 |
| 7,971,698 B2 | 7/2011 | Burstrom | |
| 8,371,773 B2 * | 2/2013 | Bryan, Jr. | A01D 46/24 406/191 |
| 9,212,001 B2 | 12/2015 | Brandon | |

OTHER PUBLICATIONS

Examiner Interview Summary dated Sep. 23, 2015 from U.S. Appl. No. 14/132,613.

Notice of Allowance dated Oct. 5, 2015 from U.S. Appl. No. 14/132,613.

Non-Final Office Action dated Feb. 18, 2016 from U.S. Appl. No. 14/881,280.

May 5, 2016 Reply to Non-Final Office Action dated Feb. 18, 2016 from U.S. Appl. No. 14/881,280.

Final Office Action dated Jun. 9, 2016 from U.S. Appl. No. 14/881,280.

* cited by examiner

DEBRIS CHUTE

CROSS-REFERENCE TO RELATED APPLICATIONS

This application is a continuation-in-part patent application of U.S. application Ser. No. 14/881,280 entitled "DEBRIS CHUTE," filed on Oct. 13, 2015, and U.S. application Ser. No. 14/132,613 entitled "DEBRIS CHUTE," filed on Dec. 18, 2013, now U.S. Pat. No. 9,212,001, both of which are incorporated herein by reference.

FIELD OF THE INVENTION

The invention relates to the field of debris removal devices, systems and methods, and more particularly, to the removal of vegetation related debris.

BACKGROUND

Trees, bushes and other plants are common in both planned landscaping, as well as "naturally" occurring landscapes. Such trees, bushes and plants may be generally referred to herein as "vegetation." As is well known, such vegetation often requires regular maintenance for aesthetic reasons, safety, and the health of the vegetation itself. A significant component of the maintenance includes pruning/trimming portions of the vegetation, including, various branches and limbs, leaves, fruits, nuts, and other portions of the vegetation found on thereon. Such portions may be generally referred to herein as "debris."

However, when the debris is removed from elevated portions of the vegetation, for example, palm cuttings at the top of a palm tree, it is simply aimed and released and hopefully lands in a desired area or "target area." Due to the height from which the debris is dropped and the natural tendency of the debris to "sail" on its own, the actual landing area can be some distance from the desired location (twenty feet or more). Thus, there is a risk that debris could unintentionally hit people, vehicles, property or other vegetation, causing damage. Moreover, because the debris may land in many different locations, significant time is required to gather and dispose of the debris after trimming.

Thus, a device that helps direct the debris to the target area and away from people, vehicles, property and other vegetation is desired. Additionally, a device which aids in keeping debris in a particular location is desired.

SUMMARY OF THE INVENTION

In accordance with exemplary embodiments, the present invention comprises devices, systems and methods for debris removal comprising a flexible chute having a mouth, a body, and an exit. The flexible material can be collapsible. In some embodiments, the flexible material is rip-stop nylon. In various embodiments, the body can comprise multiple body portions connected by various fasteners. In some embodiments, the chute can have various reinforcing members.

In various embodiments, when the chute is used, a user can take the chute in a collapsed configuration and scale a tree for trimming. Upon reaching a top area of the tree, the user secures the chute to the tree and allows the body and exit portions to deploy by releasing those sections. Gravity allows the body and exit portions to fall to towards the ground. As debris is removed from the tree, it is placed into the mouth and passes through the body and out exit. If desired, the exit can be placed in other desired locations such as proximate to a wood chipping device for shredding debris or proximate to a truck bed, dump box or trailer for catching the debris as it exits the chute. Thus, the chute can safely collect, control and direct debris generated from pruning vegetation.

BRIEF DESCRIPTION OF THE DRAWINGS

The accompanying drawings provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
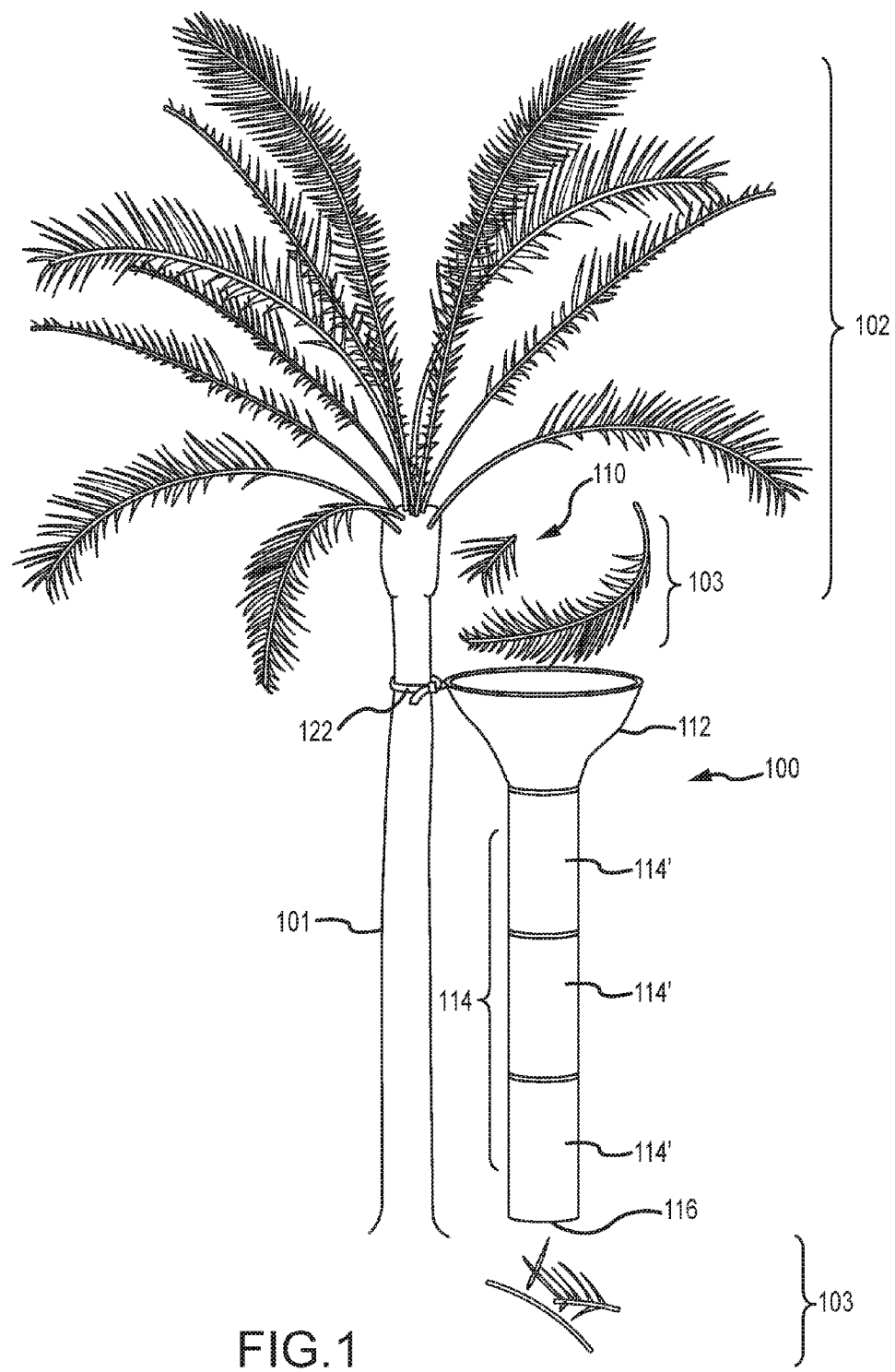
FIG. 1 is a front view of an embodiment of a chute in connection with vegetation to be trimmed.

Persons skilled in the art will readily appreciate that various aspects of the present invention may be realized by any number of methods and apparatuses configured to perform the intended functions. Stated differently, other methods and apparatuses may be incorporated herein to perform the intended functions. It should also be noted that the accompanying drawing figures referred to herein are not all drawn to scale, but may be exaggerated to illustrate various aspects of the present invention, and in that regard, the drawing figures should not be construed as limiting. Finally, although the present invention may be described in connection with various principles and beliefs, the present invention should not be bound by theory.

Figure 2:
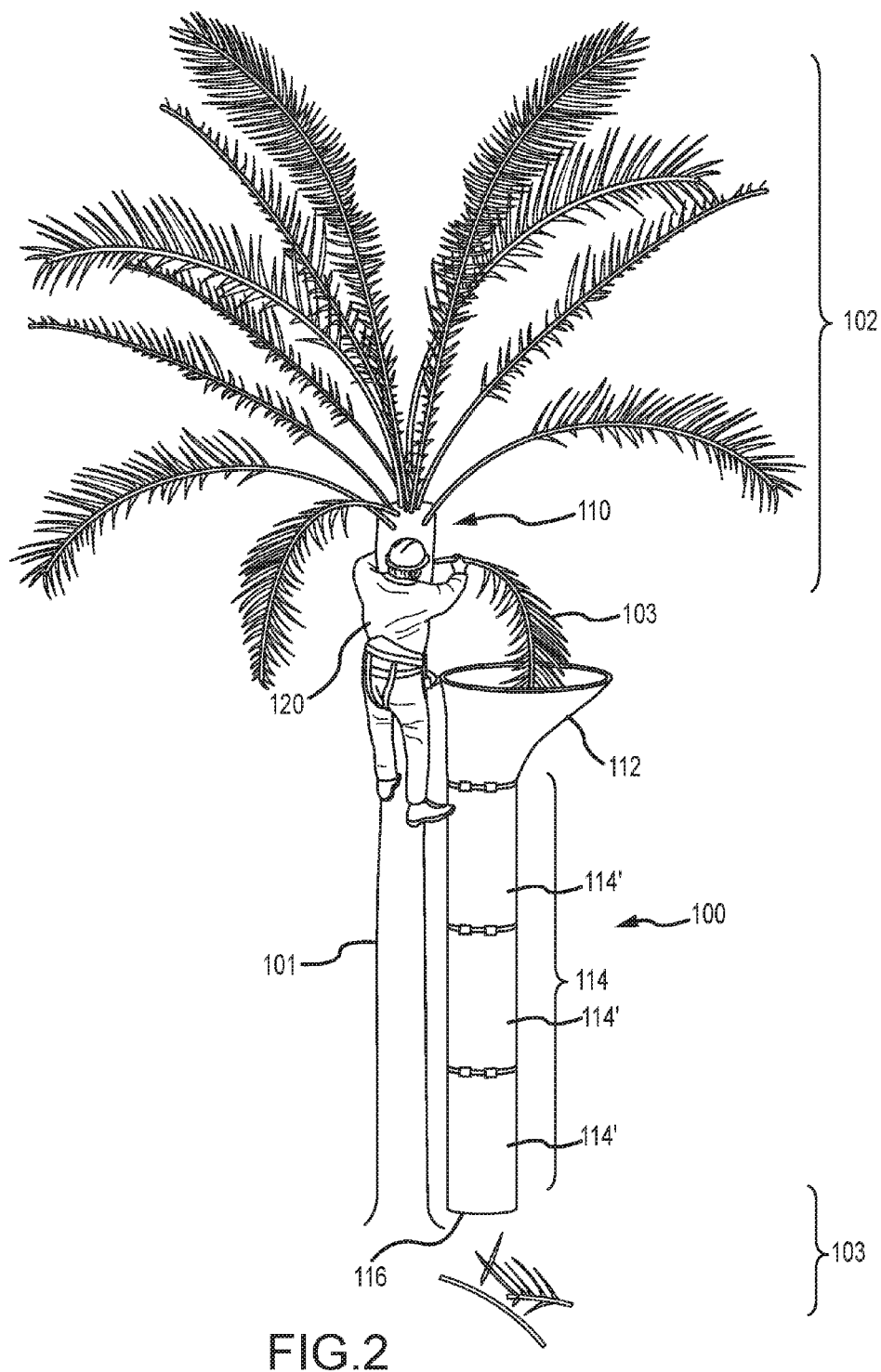
FIG. 2 is a front view of another embodiment of a chute in connection with vegetation being trimmed.

The above being noted, with reference to FIGS. 1 and 2, vegetation such as a palm tree 101 has a number of palm fronds 102 at an upper portion 110 of the palm tree 101. When the palm fronds 102 are trimmed from the palm tree 101, they are generally dropped from the upper portion and gravity causes the trimmed palm fronds, tree trimmings or, simply, "debris" 103 to fall to an area at or near the ground. As noted above, if the debris 103 is simply dropped, there is a risk that debris 103 may sail or otherwise fall to an undesired location. Additionally, as should be appreciated by one of ordinary skill in the art, other vegetation aside from palm trees may also be subject to similar risks during trimming, and the present discussion, though discussed herein in the context of palm trees, should not be construed as so limited.

Thus, in accordance with various exemplary embodiments, a tree trimmings removal device is provided. For example, a tree trimmings removal device may comprise a debris removal chute 100, or simply, a "chute." In general, the chute 100 comprises any device capable of containing and directing debris 103 from one area to another area. For example, with continuing reference to FIGS. 1 and 2, the chute 100 comprises a mouth 112, a body 114, and an exit 116.

Often, though not necessarily, the mouth 112 can have a cross-sectional opening that is larger than the cross-section of the body 114 or exit 116. The larger mouth 112 helps facilitate the catching and containment of the debris 103. In general, the mouth 112, body 114, and exit 116 can be configured in any desirable shape (e.g., circular, elliptical, square, etc.), size (e.g., diameter or cross-sectional areas) and length, depending on the application. For example, in the context of palm trees, the mouth 112, body 114, and exit 116 are generally circular, and the mouth 112 is approximately 32 inches in diameter, while the body 114 and exit 116 are approximately 18 inches in diameter. The total length of chute 100 may vary, but in exemplary embodiments can range from about 20 to about 80 feet.

In various embodiments, the various portions of mouth 112, body 114, and/or exit 116 can comprise reinforcing members. Such reinforcing members may be any material suitable for strengthening chute 100 and/or maintaining chute 100 in a desired shape. For example, in some embodiments, any of mouth 112, body 114 and/or exit 116 may have one or more elliptical or circular rings attached to it to give a round opening and/or to strengthen it. In other embodiments, any of mouth 112, body 114 and/or exit 116 may have reinforcing members that run laterally along the length of chute 100. In various embodiments, the reinforcing members comprise materials that give suitable rigidity, but without sacrificing some amount of flexibility. For example, suitable materials can include fiberglass rods, metal wire rods, plastic rods or the like.

Figure 5A:
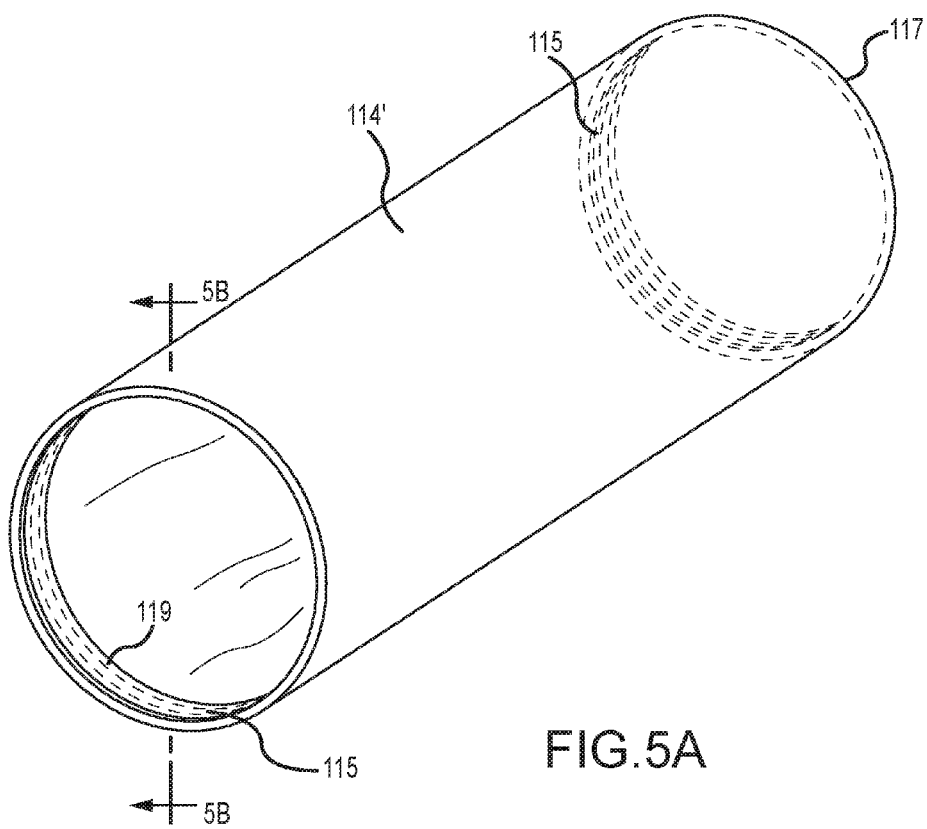
FIG. 5A is a perspective view of an embodiment of a body portion of a chute showing elliptical rings integrated with the body section.
Figure 5B:
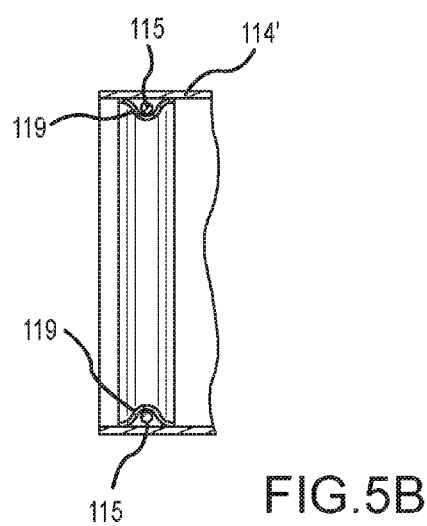
FIG. 5B is a cross-sectional view Section 5B-5B of the body portion of a chute of FIG. 5A showing elliptical rings integrated with the body portion.

For example, with reference to FIGS. 5A and 5B, a flexible tree trimmings removal chute body portion 114' capable of being collapsed and deployed is illustrated. In the illustrated embodiment, the body portion 114' has a perimeter 117. In various embodiments, the body portion 114' may comprise a rip-stop nylon material, though other suitably flexible, strong materials may be substituted (e.g., canvas and other fabrics). The body portion 114' may be continuous about the perimeter 117. In various embodiments, the body 114 or a specific body portion 114' may have at least two elliptical fiberglass reinforcing members 115 integrated within the body portion 114' to maintain the body 114 or body portion 114' in an open position. In an embodiment, the reinforcing members 115 run coincident with the perimeter 117 (e.g., elliptically in the illustrated embodiment).

The reinforcing members may be integrated on an interior surface or an exterior surface of the body portion 114'. For example, with specific reference to FIG. 5B, in some embodiments, a piece of material 119 may be sewn into the body portion 114' to create a pocket or sleeve through which the reinforcing member may be inserted and maintained, thus integrating it with the body portion 114'.

Alternatively, in some embodiments, the material 119 may be releasably attached via mechanisms other than being sewn (e.g., using stitches of thread). For example, Velcro, zippers, snaps, buttons, or the like, on one or both sides of the material 119 may be employed. In such manner, instead of sliding a reinforcing member through the pocket or sleeve, the material may effectively be applied over the reinforcing member 115, and then the material 119 adhered to the body portion 114' to maintain the reinforcing member 115 in place.

In various embodiments, the material 119 maybe the same material as the body portion 114', though in others, it may be a different material than the body portion 114'. Additionally, the material 119 may be continuous about the perimeter 117 of the body portion 114' or may be intermittent about the perimeter.

In various embodiments, the chute 100 can comprise multiple sections that may be interconnected, for example, to customize the length and configuration of the chute 100. For example, with reference to FIGS. 1 and 2, the body 114 may comprise multiple body sections 114' that are interconnected. As illustrated, three body portions 114' are connected to one another, with the two end portions being connected to the mouth 112 and the exit 116, respectively. The body portions 114' may be connected by any suitable manner, including, by way of non-limiting example, Velcro, zippers, hooks and loops, snaps, pins or the like.

Chutes 100 in accordance with various embodiments may comprise any suitable material. For example, in some embodiments, chute 100 is comprised of a material sufficiently strong to resist tearing or damage from debris 103. Such materials include various natural materials, polymers, metals, and fabrics made out of the same, as well as other materials. Exemplary fabrics include flexible materials such as heavy duty canvas or "rip-stop" nylon.

Figure 3:
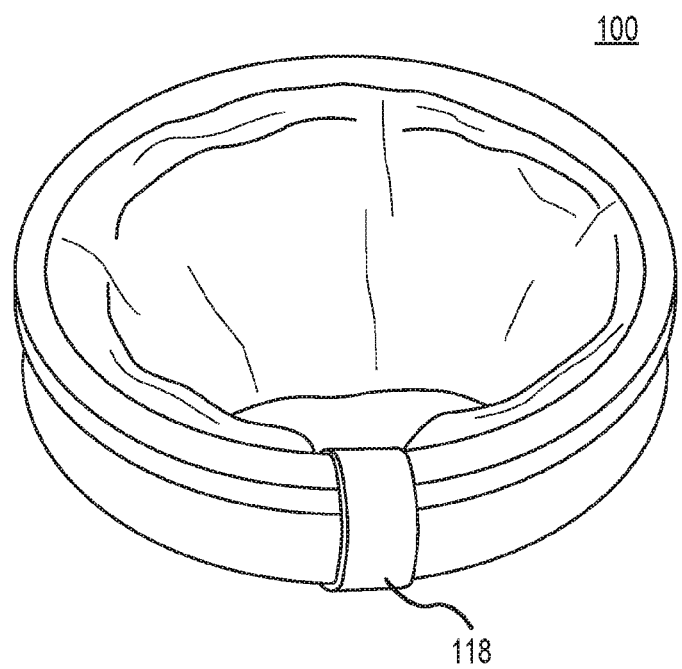
FIG. 3 is a perspective view of an embodiment of a chute in a collapsed configuration.

A benefit of chutes 100 using flexible materials is the ability to more easily store and handle chute 100 when not in use and/or prior to deployment. For example, with momentary reference to FIG. 3, an embodiment of a nylon chute 100 is shown in a collapsed configuration, wherein the mouth 112, body 114, and exit 116 are pushed together, and optionally fastened with one or more fasteners 118, so that chute 100 is a compressed ring. The collapsed configuration of chute 100 allows a user 120 to more easily carry chute 100 up tree 101, for example, over a shoulder or otherwise tethered to the user 120. Additionally, the use of fabrics such as nylon allow the chute 100 to be light enough for the user to carry.

Figure 4:
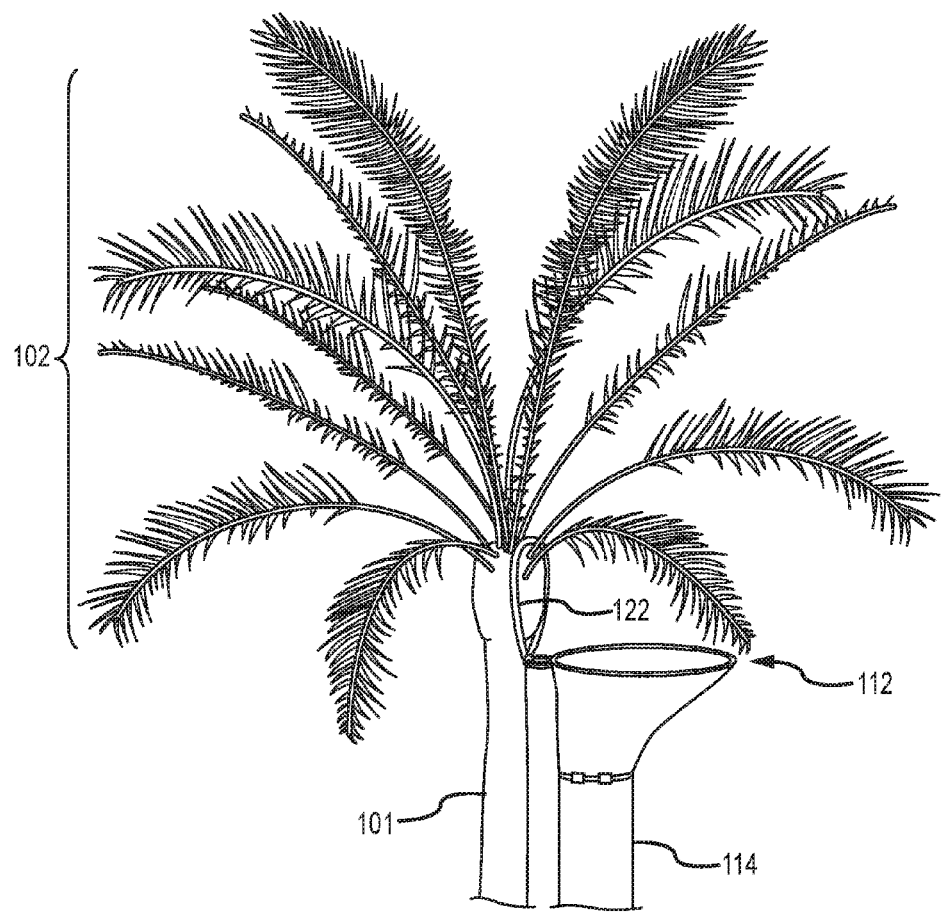
FIG. 4 is a front view of yet another embodiment of a chute in connection with vegetation being trimmed.

In various embodiments, when chute 100 is used, a user will typically take chute 100 in a collapsed form and scale a tree, such as palm tree 101. Instead of scaling (climbing) the tree 101, using other means such as lifts, ladders, buckets or the like to reach the top area of the tree 101 may be used. Upon reaching the top area 110 of the tree 101, user 120 secures chute 100 to the tree 101 using a securement connector, such as, for example, by using a now known or as yet unknown belt system 122 which encircles the tree 101. Alternatively, with reference to FIG. 4, belt system 122 can comprise a rope or other flexible member that can be tied to the palm fronds or branches, and hang from the tree 101.

Upon appropriate securement to the tree 101, the user 120 allows the body 114 and exit 116 to deploy by releasing those sections. Gravity allows body 114 and exit 116 to fall to towards the ground. Alternatively, the body 114 and exit 116 may be deployed as the user 120 scales or traverses to the top area 110 of the tree 101. In such embodiments, the body 114 and exit 116 are positioned at the base of the tree 101 and the chute 100 unfolds or otherwise deploys as the user 120 moves to the top area 110 of the tree 101.

As debris 103 is removed from tree 101, it is placed (or falls) into mouth 112 and passes through body 114, and out exit 116. Exit 116 can be directed at a desired location on the ground, and debris 103 will accumulate at that location, without causing damage to the surroundings.

Additionally, clean-up is more efficient because the debris 103 is found in one location instead of spread about. Moreover, if desired, exit 116 can be placed in other desired locations. For example, exit 116 can be placed proximate to a wood chipping device for shredding debris 103 as it falls.

Alternatively, exit 116 can be placed proximate to a truck bed, dump box or trailer for catching debris 103 as it exits chute 100.

It will be apparent to those skilled in the art that various modifications and variations can be made in the present invention without departing from the spirit or scope of the invention. For example, numerous materials, shapes, sizes and configurations can be substituted in place of those described herein. Thus, the present invention covers the modifications and variations of this invention provided they come within the scope of the appended claims and their equivalents.

What is claimed:

1. A tree trimmings removal device comprising:
   a flexible tree trimmings removal chute having a collapsed state and a deployed state, the flexible tree trimmings removal chute further comprising:
   a mouth,
   a removal chute securement connector;
   a body portion having a perimeter and comprising a rip-stop nylon material, the body portion being continuous about the perimeter and having at least two elliptical fiberglass reinforcing members integrated within the body portion to maintain the body portion in an open position, the at least two elliptical fiberglass reinforcing members running coincident with the perimeter; and
   and an exit.

2. The tree trimmings removal device of claim 1, wherein the flexible tree trimmings removal chute is collapsible by compressing the mouth towards the exit.

3. The tree trimmings removal device of claim 2, wherein the flexible tree trimmings removal chute is maintained in a collapsed configuration by a fastener.

4. The tree trimmings removal device of claim 1, comprising multiple body portions.

5. The tree trimmings removal device of claim 4, wherein the multiple body portions are interconnected by at least one of Velcro, zippers, hooks and loops, snaps, and pins.

6. The tree trimmings removal device of claim 1, wherein the removal chute securement connector comprises a belt for securing the chute to a tree.

7. The tree trimmings removal device of claim 1, wherein the exit is directed toward a target area.

8. The tree trimmings removal device of claim 7, wherein the target area is at least one of the ground, a wood chipper, a truck bed, a dump box and a trailer.

9. The tree trimmings removal device of claim 1, wherein the mouth has a mouth cross-sectional area, the body portion has a body cross-sectional area, and the exit has an exit cross-sectional area, and the mouth cross-sectional area is larger than the body cross-sectional area and the exit cross-sectional area.

10. The tree trimmings removal device of claim 1, wherein the at least two elliptical fiberglass reinforcing members are integrated within the body portion with a piece of material.

11. The tree trimmings removal device of claim 10, wherein the piece of material is intermittent about the perimeter.

12. The tree trimmings removal device of claim 10, wherein the piece of material is continuous about the perimeter.

13. The tree trimmings removal device of claim 10, wherein the piece of material is releasably attached to the body portion.

14. The tree trimmings removal device of claim 13, wherein the piece of material is releasably attached using at least one of stitches, Velcro, zippers, snaps, and buttons.

15. The tree trimmings removal device of claim 10, wherein the piece of material is attached on at least one of an exterior surface or an interior surface of the body portion.

* * * * *